No. 749,292. PATENTED JAN. 12, 1904.
B. J. HUCK.
GRASS DESTROYER.
APPLICATION FILED JUNE 27, 1903.
NO MODEL.
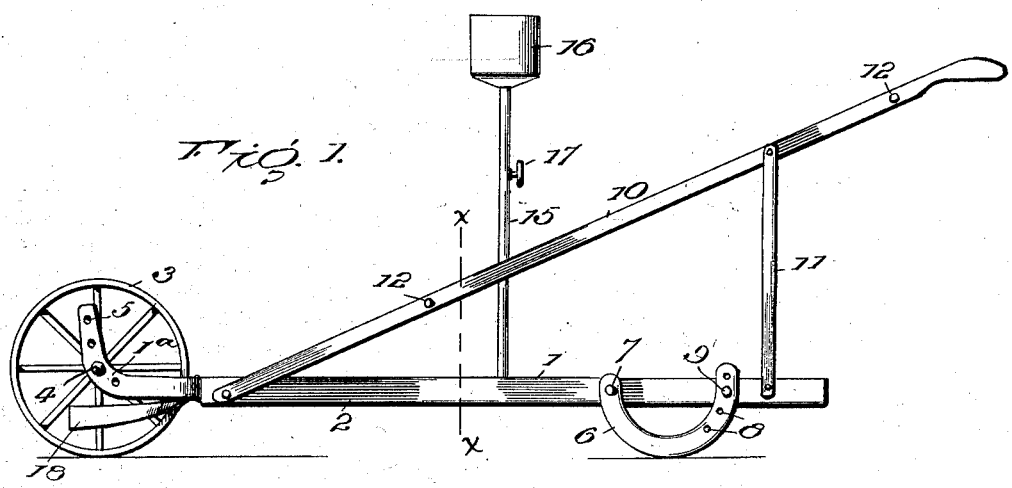
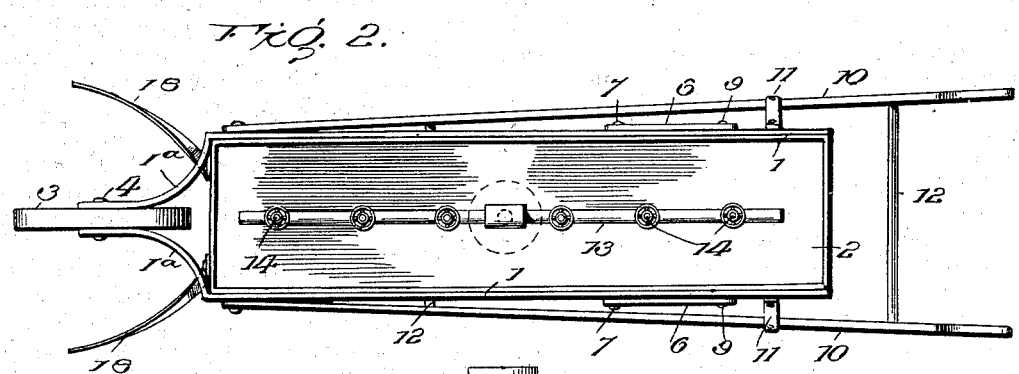
Inventor
Benjamin J. Huck
Witnesses
By
R. S. & A. B. Lacey, Attorneys No. 749,292. Patented January 12, 1904.

UNITED STATES PATENT OFFICE.

BENJAMIN J. HUCK, OF INDEPENDENCE, LOUISIANA.

GRASS-DESTROYER.

SPECIFICATION forming part of Letters Patent No. 749,292, dated January 12, 1904.

Application filed June 27, 1903. Serial No. 163,336. (No model.)

*To all whom it may concern:*

Be it known that I, BENJAMIN J. HUCK, a citizen of the United States, residing at Independence, in the parish of Tangipahoa and State of Louisiana, have invented certain new and useful Improvements in Grass-Destroyers, of which the following is a specification.

This invention has for its object to devise a novel form of burner for destroying grass in growing patches of fruit and crop without injuring the crop or the mulching, the same comprising a box closed at its top and sides and open at its bottom and mounted upon supports to admit of its vertical adjustment, a hydrocarbon-burner located within the box for furnishing the heat and flame essential to exterminating the grass or other objectionable growth, a reservoir for supplying the burner with oil, and handles to admit of convenient manipulation of the contrivance when in operation.

The invention consists of the novel features, details of construction, and combinations of parts, which hereinafter will be more particularly set forth, illustrated, and finally claimed.

In the drawings hereto attached and forming a part of the specification, Figure 1 is a side elevation of a burner embodying the invention. Fig. 2 is a view of the machine inverted. Fig. 3 is a transverse section about on the line $x$ $x$ of Fig. 1 looking to the rear.

Corresponding and like parts are referred to in the following description and indicated in all the views of the drawings by the same reference characters.

The body of the device is approximately of box form, being open at the bottom and having its inclosing walls of comparatively shallow depth or height. Bars 1 are preferably applied to the side walls of the body or box 2 to stiffen and strengthen same, and their forward ends extend in front of the body and are forwardly and upwardly converged and receive between their terminal portions groundwheel 3, the same being mounted upon a pin or bolt 4, constituting an axle. The upwardly and forwardly curved ends 1ª of the side bars 1 are provided with a series of openings 5 in transverse alinement for reception of the pin or bolt 4, thereby admitting of vertical adjustment of the body at its front end to adapt the device to the height of grass or other growth to be exterminated. Runners 6 adjustably support the rear portion of the machine and are longitudinally curved and are pivoted at one end to the body 2, as shown at 7, and have the opposite end portion provided with a series of openings 8, through any one of which a pin or like fastening 9 is passed for securing the runner to the body 2 in an adjusted position.

The handle-bars 10 are connected at their lower forward ends to the body 2 in any substantial way and are supported intermediate of their ends by stays 11, said stays and handle-bars being transversely connected by means of braces 12. The machine being comparatively light is adapted to be advanced over the patch or surface from which the grass or other growth is to be burned by the application of force to the handle-bars either to push the machine or to draw the same after the fashion of manpulating the ordinary handbarrel.

The burner arranged within the body or box 2 may be of any structural type and comprises a pipe 13, extending lengthwise of the body and provided at intervals in its length with burners 14. A supply-pipe 15 is connected with the distributing-pipe 13 and is provided with an oil tank or reservoir 16 and with a controlling-valve 17.

In the event of the grass or other growth being short the body or box 2 is lowered, so as to insure effective application of the flame for destroying the same. If the grass, weeds, or the like is tall, the body or box 2 is accordingly elevated. After the body has been adjusted as to elevation to secure the best results and the burner lighted the machine is advanced over the patch or surface, and the flame being confined by the body 1 is deflected downward thereby and thoroughly and effectually destroys the grass, weeds, or other objectionable growth. The sides of the body or box prevent spreading of the flame and confine the same and the heat, thereby preventing injury to the crop and to the mulching protecting the roots.

From the forward end of the body extend gatherers 18 for drawing the grass, weeds, and like growth into the track of the machine for destruction by the flame. These gatherers are forwardly diverged and consist of plates or strips attached to the body 2 in any substantial manner.

Having thus described the invention, what is claimed as new is—

1. In a machine for exterminating grass and other objectionable growth, the combination of a hollow body, a ground-wheel adjustably connected to the front portion of said body, runners having adjustable connection with the rear portion of said body, handle-bars applied to said body to admit of manipulation thereof, and a burner arranged within said body, substantially as set forth.

2. In a machine substantially as set forth for destroying grass and like objectionable growth, the combination of a hollow body, reinforcing-bars applied to the sides of said body and having their front ends extended forward of the body and inwardly and upwardly curved and having a series of transversely-alined openings in the forwardly and upwardly curved end portions, a ground-wheel arranged between the upwardly-extended end portions of the reinforcing-bars, a pin for supporting the ground-wheel and adapted to be fitted into any one of the series of openings of the extended ends of said reinforcing-bars, rear supports having adjustable connection with the body, a burner located within the body, and handle-bars applied to the body for manipulation of the machine, substantially as set forth.

In testimony whereof I affix my signature in presence of two witnesses.

BENJAMIN J. HUCK. [L. S.]

Witnesses:
J. E. STRICKLAND,
W. E. DORBONDE.